(12) United States Patent
Jung et al.

(10) Patent No.: US 11,587,203 B2
(45) Date of Patent: Feb. 21, 2023

(54) METHOD FOR OPTIMIZING HARDWARE STRUCTURE OF CONVOLUTIONAL NEURAL NETWORKS

(71) Applicant: INDUSTRY-ACADEMIC COOPERATION FOUNDATION, YONSEI UNIVERSITY, Seoul (KR)

(72) Inventors: Seong Ook Jung, Seoul (KR); Su Min Lee, Seoul (KR); Sung Hwan Joo, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 297 days.

(21) Appl. No.: 16/992,066

(22) Filed: Aug. 12, 2020

(65) Prior Publication Data

US 2021/0366080 A1 Nov. 25, 2021

(51) Int. Cl.
| | |
|---|---|
| G06K 9/00 | (2022.01) |
| G06T 3/40 | (2006.01) |
| G06N 3/063 | (2023.01) |
| G06K 9/62 | (2022.01) |
| G06N 3/08 | (2023.01) |

(52) U.S. Cl.
CPC .......... *G06T 3/4046* (2013.01); *G06K 9/629* (2013.01); *G06K 9/6232* (2013.01); *G06N 3/063* (2013.01); *G06N 3/08* (2013.01)

(58) Field of Classification Search
CPC ....... G06T 3/4046; G06T 1/20; G06K 9/6232; G06K 9/629; G06N 3/063; G06N 3/08; G06N 3/0454; G06N 3/04; G06V 10/82; G06V 10/94
See application file for complete search history.

(56) References Cited

U.S. PATENT DOCUMENTS

2019/0197083 A1* 6/2019 Chen .................. G06N 3/04

FOREIGN PATENT DOCUMENTS

| CN | 110580704 A | * | 12/2019 |
|---|---|---|---|
| CN | 110647898 A | * | 1/2020 |
| CN | 111091130 A | * | 5/2020 |
| KR | 10-2018-0073118 A | | 7/2018 |

\* cited by examiner

*Primary Examiner* — Dhaval V Patel

(57) ABSTRACT

A method for optimizing a hardware structure of a convolutional neural network including: searching an initial feature value group by which a final convolution layer located at a final stage among a plurality of convolution layers, setting an initial fusing network by analyzing a feature value group having a size corresponding to the initial feature value group; computing an operation time for each layer by allocating the number of operators corresponding to the size of the feature value group to each of the plurality of convolution layers, and dividing the size of the feature value group by determining a layer having a minimum operation time; resetting the fusing network by changing the size of the feature value group, determining the size of the feature value group having the smallest number of operators, determining the number of operators to be included in each of the plurality of convolution layers.

15 Claims, 5 Drawing Sheets

FIG. 2

$$\begin{bmatrix} x_{11} & x_{12} & x_{13} & x_{14} & x_{15} \\ x_{21} & x_{22} & x_{23} & x_{24} & x_{25} \\ x_{31} & x_{32} & x_{33} & x_{34} & x_{35} \end{bmatrix} \otimes \begin{bmatrix} k_{11} & k_{12} & k_{13} \\ k_{21} & k_{22} & k_{23} \\ k_{31} & k_{32} & k_{33} \end{bmatrix} = y_{11}\ y_{12}$$

FM — KN — with groups g1, g2, g3

METHOD FOR OPTIMIZING HARDWARE STRUCTURE OF CONVOLUTIONAL NEURAL NETWORKS

CROSS-REFERENCE TO RELATED APPLICATION

This application claims priority under 35 U.S.C. 119(a) to Korean Patent Application No. 10-2020-0060185 filed on May 20, 2020 in the Korean Intellectual Property Office, and all the benefits accruing therefrom under 35 U.S.C. 119, the contents of which in their entirety are herein incorporated by reference.

BACKGROUND

1. Technical Field

The present disclosure relates to a method for optimizing a hardware structure of a convolutional neural network, and it relates to a method for optimizing a hardware structure by minimizing the difference in latency between layers of a convolutional neural network.

2. Description of the Related Art

An artificial neural network is learned by a deep learning method using a large amount of learning data, and thus exhibits superior performance than existing algorithms. For this reason, the artificial neural network has recently been applied in various fields.

In addition, as one of the fields using the artificial neural network, an image up-scaling technique that converts a low resolution image into a higher resolution image is getting attention. Recently, the image up-scaling technique has been applied to convert an FHD (Full High Definition) image to an UHD (Ultra High Definition) image. When such an image up-scaling technique is applied, an FHD image may be transmitted as it is and converted into the UHD high-resolution image by a user terminal. Therefore, in addition to being able to effectively reuse a large number of existing FHD contents, there is a benefit of using a small communication band.

The image up-scaling technique performed using the artificial neural network is also well known as a super-resolution technique. In the super-resolution technique, a convolutional neural network (hereinafter, CNN), which is an artificial neural network that exhibits very good performance in an image processing field, is mainly used. However, the artificial neural network such as the CNN has limitations in that it is difficult to implement it in hardware due to high computational complexity.

For example, when implementing an FSRCNN-s (mall model size version of Fast Super-Resolution Convolutional Neural Network), which is a CNN algorithm applied to the super resolution technique, in hardware, a 5.2GOP operation should be performed to up-scale an FHD image with a resolution of 1920×1080 to a UHD image with a resolution of 3840×2160. Therefore, in order to up-scale an FHD image of 60 frames per second in real time, a throughput of 311.7 GOP level is required. Therefore, in order to satisfy the required throughput, a parallel computation processing using a large number of operators should be performed.

However, it is difficult to implement such a large amount of operators in hardware, and in particular, it is practically impossible to integrate and implement a single chip set in hardware. Therefore, it is necessary to optimize a hardware structure of the artificial neural network operating with the required throughput.

3. Prior Art

Patent Document

Korean Patent Laid-Open No. 10-2019-0087265 (published on Jul. 24, 2019)

SUMMARY

An object of the present disclosure is to provide a method for optimizing a hardware structure of a convolutional neural network that may optimize the hardware structure by minimizing the number of operators while satisfying a throughput required for the convolutional neural network.

Another object of the present disclosure is to provide a method for optimizing a hardware structure of a convolutional neural network, in which a minimum size in which parallel operations should be simultaneously performed in a final layer among a plurality of layers of the convolutional neural network may be set based on a required throughput and a size of the operation to be performed by a previous layer at one time may be adjusted according to the set minimum size, thereby performing the operation in a pipeline structure without a bottleneck.

A method for optimizing a hardware structure of a convolutional neural network according to an embodiment of the present disclosure for achieving the object includes searching an initial feature value group by which a final convolution layer located at a final stage among a plurality of convolution layers of the convolutional neural network (hereinafter, CNN) including the plurality of convolution layers may output to satisfy a system request throughput required by the system, and setting an initial fusing network by analyzing a feature value group having a size corresponding to the initial feature value group searched in previous feature maps output from other convolution layers; computing an operation time for each layer by allocating the number of operators corresponding to the size of the feature value group to each of the plurality of convolution layers based on the initial fusing network or a reset fusing network, and dividing the size of the feature value group in a predetermined manner by determining a layer having a minimum operation time among the computed operation time for each layer; and repeatedly resetting the fusing network by changing the size of the feature value group of the final convolution layer in a predetermined manner, and determining the size of the feature value group having the smallest number of operators allocated based on the size of the feature value group divided in each fusing network, thereby finally determining the number of operators to be included in each of the plurality of convolution layers.

Setting the initial fusing network may include determining the system request throughput; extracting a divisor with a predetermined axial size from a final feature map output from the final convolution layer, sequentially selecting from a smallest divisor to a larger divisor from the extracted divisor, and setting an initial operation size set according to the currently selected divisor and a predetermined size in the remaining axis direction; determining an operation time required for the final convolution layer according to the operation size; setting a minimum operation size having an operation time that satisfies the system request throughput among the determined operation times as the initial feature value group; and determining the feature value group having the size corresponding to the initial feature value group from each of the feature maps output from each of the remaining convolution layers other than the final convolution layer and setting it as the initial fusing network.

Determining the system request throughput may compute the system request throughput as a final feature value acquisition request time, which is a time at which a final feature value should be acquired, in which the final feature value is the feature value of the final feature map that the final convolution layer outputs for a normal operation of the system.

When the number of operators corresponding to the operation size set in the final convolution layer is allocated, determining the operation time may compute the operation time as a final feature value acquisition time required for the final convolution layer to acquire one feature value from the final feature map.

When it is determined that the final feature value acquisition time computed in setting the minimum operation size as the initial feature value group is greater than the final feature value acquisition request time, setting the operation size may select a divisor greater than the currently selected divisor among the divisors with the predetermined axial size in the final feature map.

When it is determined that the computed final feature value acquisition time is less than or equal to the final feature value acquisition request time, setting the minimum operation size as the initial feature value group may set the currently selected divisor and the operation size of the predetermined size in the remaining axis direction as the initial feature value group.

Setting the initial fusing network may include determining the feature value group having the size corresponding to the initial feature value group set in each of the feature maps output from the remaining convolution layers, based on at least one kernel size of the remaining convolution layers other than the final convolution layer and setting the initial fusing network.

Dividing may include assigning the number of operators corresponding to the size of the feature value group set in each of the plurality of convolution layers corresponding to the initial fusing network or the reset fusing network; computing an operation time required to operate the feature value group corresponding to each of the plurality of convolution layers according to the number of assigned operators; determining a maximum operation time and a minimum operation time among the operation times computed for each of the plurality of convolution layers; determining the convolution layer having the minimum operation time, and dividing the size of the feature value group corresponding to the determined convolution layer; reducing the number of operators according to the divided size of the feature value group and reallocating them, and re-computing the operation time; storing the divided size of the feature value group and re-determining the convolution layer having the minimum operation time again based on the recomputed operation time when the recomputed operation time is less than or equal to the maximum operation time; and determining a size of a previously last stored feature value group as an size of an optimal feature value group of the currently set fusing network.

Dividing the size of the feature value group may include determining a size in each axial direction of the feature value group; analyzing the number of divisors of each of the determined axial sizes; selecting an axial direction having the greatest number of divisors among the number of analyzed axial divisors; and dividing the feature value group in the selected axial direction.

Dividing in the axial direction may divide the feature value group into the smallest divisor other than 1 of the selected axial divisors.

Finally determining may include repeatedly resetting a plurality of fusing networks corresponding to the feature value group that is set by selecting the divisor greater than the divisor set as the initial feature value group among the divisors extracted from the predetermined axial size in the final feature map; dividing the size of the feature value group corresponding to the convolution layer having the minimum operation time for each of the plurality of fusing networks that are repeatedly reset and comparing the total number of operators required according to the determined size of the optimum feature value group; and determining the size of the optimal feature value group with the smallest number of operators required, and determining the number of operators to be included in each of the plurality of convolution layers according to the fusing network corresponding to the determined size of the optimal feature value group.

In the CNN, the plurality of convolution layers may perform an operation according to a pipeline technique.

When the operation on the feature value group specified by the fusing network is performed in the previous convolution layer, the operated feature value group may be applied to each of the plurality of convolution layers and it performs the operation.

In the CNN, an FSRCNN-s, which up-scales an FHD image to a UHD image, may be implemented in hardware.

In accordance with the method for optimizing the hardware structure of the convolutional neural network according to the embodiment of the present disclosure, the operation size to be performed by the previous layer at a time in a reverse order may be adjusted stepwise based on the minimum operation size performed in the final layer among the plurality of layers of the convolutional neural network, and thus, the bottleneck does not occur and the operation is performed in a pipeline structure. Therefore, the number of operators may be minimized while the required throughput may be satisfied.

BRIEF DESCRIPTION OF THE DRAWINGS

The above and other aspects and features of the present disclosure will become more apparent by describing in detail exemplary embodiments thereof with reference to the attached drawings, in which:

FIG. 2 is a view for explaining a size of data that should be pre-computed in a previous convolution layer in order for a convolution layer to start a convolution operation according to a convolution operation scheme;

DETAILED DESCRIPTION OF THE EMBODIMENTS

Figure 1:
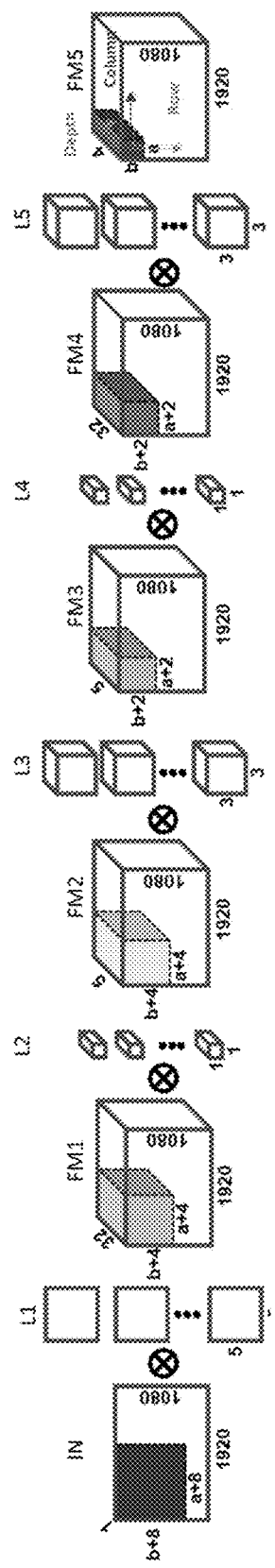
FIG. 1 shows a structure of an FSRCNN_s.

Reference should be made to the accompanying drawings and the contents described in the accompanying drawings, which illustrate preferred embodiments of the present disclosure, to fully understand the present disclosure, the operational benefits of the present disclosure, and the objects achieved by the practice of the present disclosure.

Hereinafter, the present disclosure will be described in detail by explaining preferred embodiments of the present disclosure with reference to the accompanying drawings. However, the present disclosure may be implemented in various different forms, and is not limited to the described embodiments. In addition, parts irrelevant to the description are omitted to clearly describe the present disclosure, and the same reference numerals in the drawings indicate the same members.

Throughout the specification, when a part "includes" a certain component, this means that other components may not be excluded, and other components may be further included unless otherwise stated. In addition, terms such as "... unit," "... part," "module," and "block" described in the specification mean a unit that processes at least one function or operation, and it may be implemented in hardware or software or a combination of hardware and software.

Figure 3:
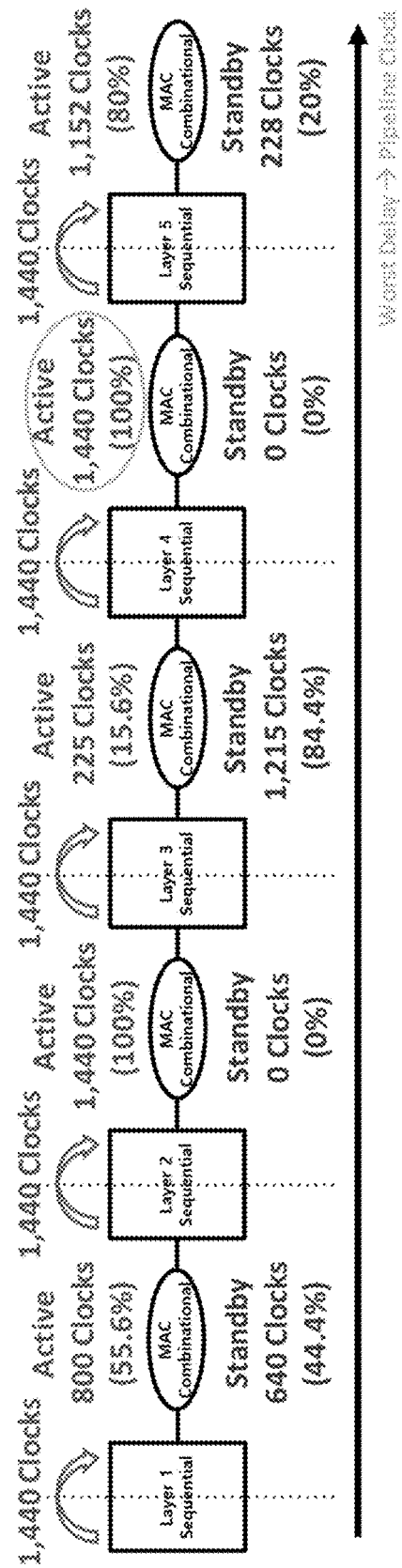
FIG. 3 shows a standby time for each layer when the FSRCNN_s of FIG. 1 is operated using a pipeline technique.

FIG. 1 shows a structure of an FSRCNN_s. FIG. 2 is a view for explaining a size of data that should be pre-computed in a previous convolution layer in order for a convolution layer to start a convolution operation according to a convolution operation scheme. FIG. 3 shows a standby time for each layer when the FSRCNN_s of FIG. 1 is operated using a pipeline technique.

In FIG. 1, it shows the structure of the FSRCNN-s as a representative example of a super resolution technique, and it shows the structure of the FSRCNN-s that an FHD image with a resolution of 1920×1080 is applied to the FSRCNN-s as an input image and the FSRCNN-s up-scales it to a UHD image with 3840×2160 resolution and outputs it as an output image.

Referring to FIG. 1, the FSRCNN-s may include 5 convolution layers L1 to L5. Each of 5 convolution layers L1 to L5 includes at least one kernel with a predetermined size. Here, each of the at least one kernel has a structure in which a plurality of weights acquired through learning are arranged corresponding to a kernel size.

Among 5 convolution layers L1 to L5 in the FSRCNN_s, when it is expressed as width×height×depth, a first convolution layer L1 includes 32 kernels (5×5×1, 32) having a size of 5×5×1, a second convolution layer L2 includes 5 kernels (1×1×32, 5) having a size of 1×1×32, and a third convolution layer L3 includes five kernels (3×3×5, 5) having a size of 3×3×5. In addition, a fourth convolution layer L4 includes 32 kernels (1×1×5, 32) having a size of 1×1×5, and a fifth convolution layer L5 includes four kernels (3×3×32, 4) having a size of 3×3×32.

Among 5 convolution layers L1 to L5, an input image IN is applied to the first convolution layer L1 and the first convolution layer L1 extracts a feature using a kernel included for the approved input image, thereby acquiring a first feature map FM1. In addition, first to fourth feature maps FM1 to FM4 output from the convolution layers L1 to L3 in the previous stage are applied to each of the second to fifth convolution layers L2 to L5, and each of the second to fifth convolution layers L2 to L5 extracts features of the approved first to third feature maps FM1 to FM4, thereby acquiring second to fifth feature maps FM2 to FM5.

Here, the FSRCNN_s includes a plurality of convolution layers L1 to L5, and hierarchically extracts features to acquire a feature map. This is to enable extraction of a higher-level feature from an input image.

In a general FSRCNN_s, 4 convolution layers L1 to L4 and one deconvolution layer are configured to be used so as to acquire the UHD image with 3840×2160 resolution directly from the fourth feature map FM4 having a size of 1092×1080×32. However, the deconvolution layer requires a lot of computation. Therefore, recently, a shuffling layer capable of significantly reducing the computational amount is mainly used as a replacement for the deconvolution layer. For the shuffling layer, it is implemented as a fifth convolution layer L5 that performs a convolution operation as in the previous 4 convolution layers L1 to L4. It is configured to acquire a fifth feature map FM5 and separately perform remapping on the fifth feature map FM5 to acquire a UHD image.

In FIG. 1, it shows on the assumption that the FSRCNN_s includes five convolution layers including the shuffling layer, and the re-mapping operation, which is a post-processing operation, is an operation in which each element of the fifth feature map FM5 is rearranged at a predetermined location and an operator is not required, and thus it is not shown here.

As illustrated in FIG. 1, when the FSRCNN_s composed of the plurality of convolution layers L1 to L5 are implemented in hardware, various hardware structures may be considered. As an example, serial and parallel structures may be considered.

When implementing the FSRCNN_s composed of the plurality of convolution layers L1 to L5 in a parallel structure, it may be configured to include the number of operators corresponding to the total number of operations to be performed simultaneously in each of the plurality of convolution layers L1 to L5, so that the plurality of convolution layers L1 to L5 perform operations simultaneously. As an example, in the FSRCNN_s of FIG. 1, hardware may be implemented to include the number of operators corresponding to the size and number of kernels included in each of the input image IN and the plurality of feature maps FM1 to FM5 and the plurality of convolution layers L1 to L5.

As described above, when the hardware is implemented in the parallel structure, sequential operation is performed in units of the convolution layers L1 to L5 for the input image IN of a single frame. However, when the input image IN of a plurality of frames are applied, each of the plurality of convolution layers L1 to L5 may perform an operation on input images of different frames, thereby greatly improving an operation speed. In other words, by applying the pipeline technique, the throughput required by the system may be satisfied. However, the number and size of kernels included in the plurality of convolution layers L1 to L5 are different from each other. Therefore, even if the pipeline technique is applied, there is a problem that a difference occurs in operation time for each convolution layer L1 to L5.

If each of the convolution layers L1 to L5 of the FSRCNN_s includes the number of operators corresponding to a product of the size and number of kernels included in each of the input image IN and the plurality of feature maps FM1 to FM5 and the plurality of convolution layers L1 to L5, each convolution layer L1 to L5 may perform an operation required for a single clock, and thus there is no difference in operation time for each convolution layer L1 to L5. However, a large-scale operator is required to implement the FSRCNN_s in such a completely parallel structure, and thus it is impossible to implement it in hardware in reality.

On the other hand, when the FSRCNN_s composed of the plurality of convolution layers L1 to L5 is implemented in hardware in a serial structure, it may have only at least one operator, and the at least one operator provided may be configured to perform all of the operations required in the FSRCNN_s. In other words, the required number of operators may be minimized. However, in this case, there is a limitation that the throughput required by the system cannot be satisfied due to the decrease in operation speed.

However, when the at least one operator is provided in each of the plurality of convolution layers L1 to L5, each of the convolution layers L1 to L5 may perform an operation first based on a result of some of the operations of the convolution layer placed in the previous stage. In other words, even if the convolution layer placed in the previous stage does not complete the operation, the operation may be performed first according to the pipeline technique.

FIG. 2 is a view for explaining a size of a feature value that the convolution layer placed in the previous stage should acquire in advance in order to start the operation of the convolution layer according to the convolutional operation technique, for example, when the convolution layer placed in the previous stage acquires a feature map FM with a 3×5 size, and the kernel of the convolution layer to perform the operation has a 3×3 size.

Referring to FIG. 2, the convolution layer that needs to perform the operation has a kernel with a 3×3 size. Therefore, if only a feature value with a 3×3 size corresponding to a feature value group g1 is acquired from the feature map FM with a 3×5 size, the convolution layer may perform an operation to acquire a feature value of $y_{11}$. In other words, even if the convolution layer placed in the previous stage does not compute all feature values included in the feature map with the 3×5 size and acquires only the feature value group g1 with a 3×3 size, it may perform the operation to acquire the feature value of $y_{11}$. Similarly, if the convolution layer only acquires a feature value with a 3×3 size corresponding to a feature value group g2, it may start an operation to acquire a feature value of $y_{12}$. In addition, while the convolution layer is performing the operations to acquire the feature values of $y_{11}$ and $y_{12}$, even if the previous convolution layer acquires feature values corresponding to a feature value group g3 in advance, they are not used.

This means that even if each of the plurality of convolution layers L1 to L5 is performed only partially in the convolution layer placed in the previous stage, the operation may be started based on the acquired feature values. Further, this means that a feature value other than a feature value used in the current operation is not used even if the convolution layer placed in the previous stage acquires it in advance.

Here, the number of feature values which should be computed before each of the plurality of convolution layers L1 to L5 starts the operation, i.e., the size of the feature value group may be determined according to the size and number of kernels included in each convolution layer L1 to L5.

As described above, FIG. 1 shows the size of the feature value to be acquired in advance from the input image IN applied to each convolution layer L1 to L5 or from the plurality of feature maps FM1 to FM5 when each of the plurality of convolution layers L1 to L) of the FSRCNN_s performs a partial operation according to the pipeline technique.

Referring to FIG. 1, when the pipeline technique is applied, it is the fifth convolution layer L5 that finally performs the operation. In order for the fifth convolution layer L5 to extract a feature value with a a×b×4 size of the fifth feature map FM5, a feature value with an (a+2)×(b+2)×32 size should be extracted first at a corresponding location of the fourth feature map FM4. Similarly, in order for the fourth convolution layer L4 to extract the feature value with an (a+2)×(b+2)×32 size of the fourth feature map FM4, a feature value with an (a+2)×(b+2)×5 size should be extracted first at a corresponding location of the third feature map FM3. In the embodiment, a feature value group having a size that should be acquired beforehand in order for each convolution layer to perform an operation is referred to as a fusing network. In other words, FIG. 1 illustrates a fusing network of feature maps applied to each convolution layer in the FSRCNN_s.

As shown in FIG. 1, in order for each convolution layer L1 to L5 of the FSRCNN_s to perform a partial operation according to the pipeline technique, an operation of a size corresponding to the fusing network in the previous convolution layer should be performed in advance. Here, the number of operations required for each convolution layer L1 to L5 is different from each other. The difference in the number of operations for each convolution layer L1 to L5 causes a difference in operation time. The difference in operation time causes a standby time Standby, in which the standby time occurs because some of the convolution layers among the plurality of convolution layers L1 to L5 have not performed the operation because the feature values of the size required from the previous convolution layer are not applied even though they have performed all the operations that they currently need to perform.

Table 1 shows the size (Row×Column×Depth) and number (# of Kernels) of the kernel included in each of the plurality of convolution layers L1 to L5 in the FSRCNN_s of FIG. 1.

TABLE 1

|  | L1 | L2 | L3 | L4 | L5 |
| --- | --- | --- | --- | --- | --- |
| Row (Kx) | 5 | 1 | 3 | 1 | 3 |
| Column (Ky) | 5 | 1 | 3 | 1 | 3 |
| Depth (Kz) | 1 | 32 | 5 | 5 | 32 |
| # of Kernel (Kn) | 32 | 5 | 5 | 32 | 4 |

Considering the size and number of kernels for each convolution layer L1 to L5 shown in Table 1 and an operation scheme of the convolution operation, in order for the fifth convolution layer L5 to start an operation according to the pipeline technique, at least 3×3×32 feature values should be computed in advance corresponding to the size of the kernel of the fifth convolution layer L5 in the fourth feature map FM4. Here, the size of the kernel of the fourth convolution layer L4 may be performed by providing 32 kernels of 1×1×5 size. Therefore, in order for the fifth convolution layer L5 to start an operation, the number of times (1×1×5×3×3=1440) of the fourth convolution layer L4 multiplied by a kernel size (1×1×5) of the fourth convolution layer L4 and a row and column size (3×3) among kernel sizes of the fifth convolution layer L5 should be performed in advance.

In other words, assuming that one clock is required for one operation, in order for the fifth convolution layer L5 to start an operation, the operation of 1,440 clocks should first be performed in the fourth convolution layer L4.

In FIG. 3, an operation time required for each of the plurality of convolution layers L1 to L5 to be performed in advance by the previous layer in order to start an operation according to the pipeline technique is denoted in clock units.

Referring to FIG. 3, it may be seen that each of the first to fifth convolution layers L1 to L5 has a different size and number of different kernels, and thus the operation time that needs to be computed in advance so that the next convolution layer may operate is different from each other. In the case of the second convolution layer L2 and the fourth convolution layer L4, similarly, since the operation of 1,440 clocks should be performed, a long operation time is required. In contrast, in the case of the first, third, and fifth convolution layers L1, L3, and L5, the operation of 800 clocks, 255 clocks, and 1152 clocks should be performed. For the difference in operation time among the convolution layers L1 to L5, although it is possible for the multiple convolution layers L1 to L5 of the FSRCNN_s to perform operations according to the pipeline technique, feature values required for performing the operations are not computed in the previous convolution layer. Therefore, it leads to an unnecessary standby time that has to wait. This may be seen as a problem caused by not being able to use the operator efficiently.

In FIG. 3, the efficiency and standby time ratio of the computational efficiency for each convolution layer are denoted based on the second and fourth convolution layers L2 and L4 that require a maximum computational time. According to FIG. 3, it may be seen that the second and fourth convolution layers L2 and L4 have a standby time of 0 clock using the operator with 100% efficiency, whereas the first, third, and fifth convolution layers L1, L3, and L5 have the operation efficiencies of 55.6%, 15.6%, and 80%, respectively, and the standby times of 44.4%, 84.4%, and 20%.

The above result of FIG. 3 is an operation when it is assumed that each of the plurality of convolution layers L1 to L5 in the FSRCNN_s of FIG. 1 is implemented by including one operator. When the number of operators for each convolution layer L1 to L5 is adjusted differently from each other, this inefficiency may be greatly improved.

Therefore, a method for determining an appropriate number of operators to be included in each convolution layer L1 to L5 should be considered to optimize the hardware structure of the CNN.

Accordingly, in the embodiment, first, a final convolution layer of the plurality of convolution layers determines a minimum operation size that should be performed simultaneously to perform an operation with a throughput required by the system, and each of the previous remaining convolution layers determines an operation size to be computed in advance based on the minimum operation size determined for the final convolution layer. This is because the number of operators should be minimized at a level that satisfies the throughput required by the system. By adjusting the operation size so that the operation time according to the determined operation size of each convolution layer becomes as uniform as possible, the operation may be performed using a minimal operator without causing a bottleneck that causes a standby time when the pipeline technique is applied.

Figure 4:
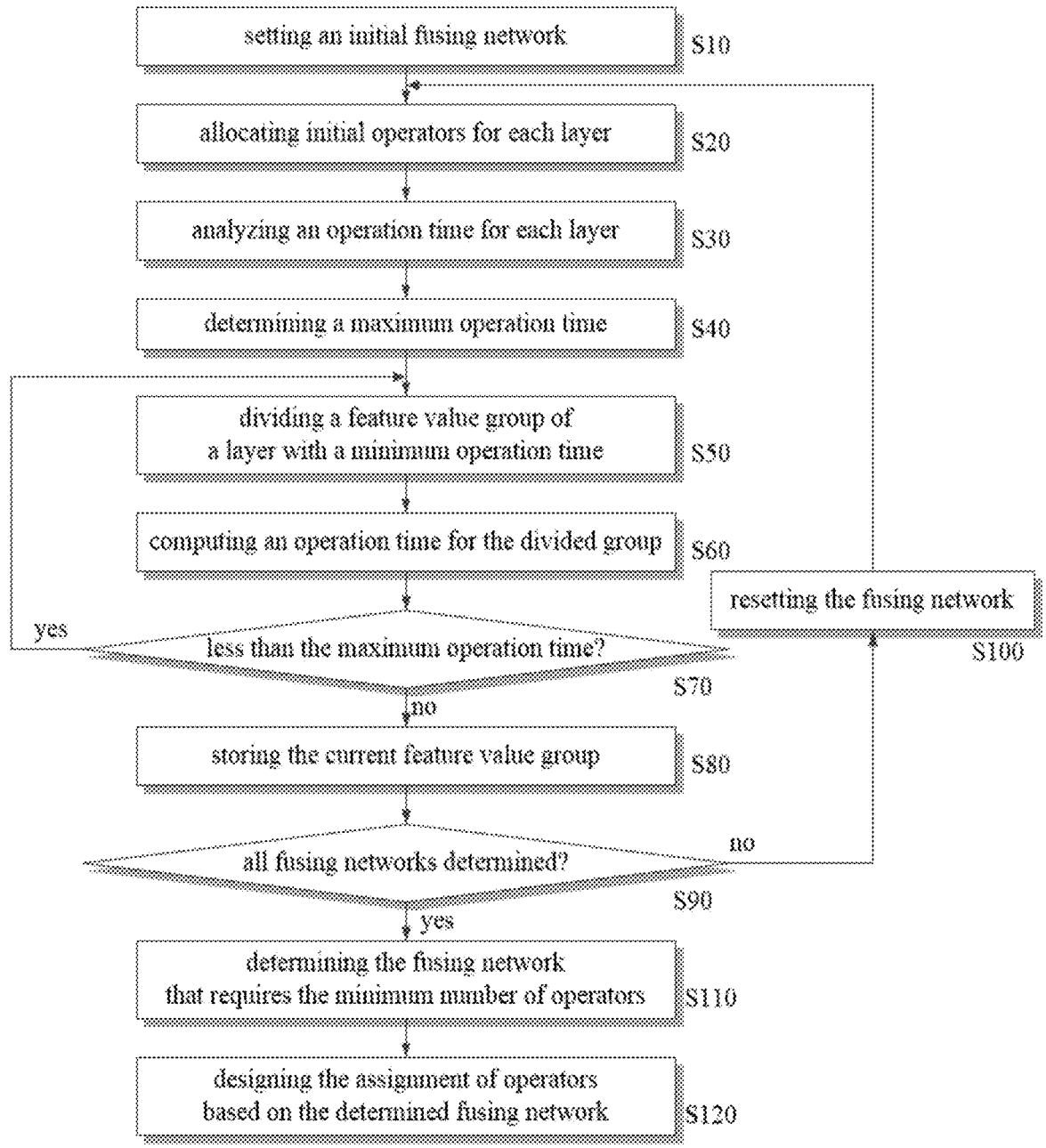
FIG. 4 shows a method for optimizing a hardware structure of a CNN according to an embodiment of the present disclosure.
Figure 5:
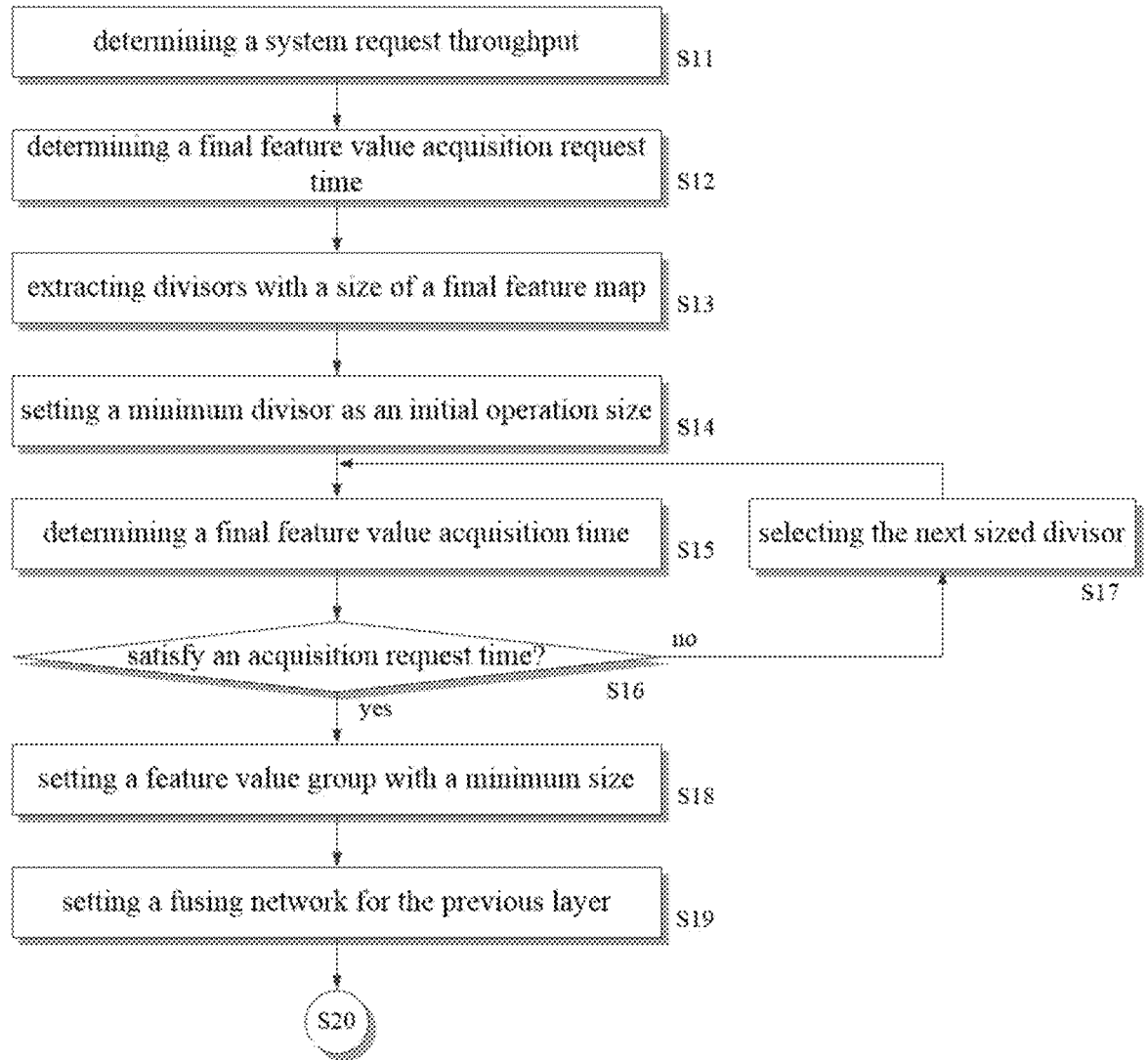
FIG. 5 is a view showing in detail setting an initial fusing network of FIG. 4.

FIG. 4 shows a method for optimizing a hardware structure of a CNN according to an embodiment of the present disclosure, and FIG. 5 is a view showing in detail setting an initial fusing network of FIG. 4.

Referring to FIG. 4, in the method for optimizing the hardware structure of the CNN according to the present embodiment, first, an initial feature value group by which a final convolution layer in the CNN may output to satisfy a system request throughput is searched, and an initial fusing network is set by analyzing a feature value group having a corresponding size in previous feature maps based on the searched initial feature value group (S10). The final convolution layer (here, the fifth convolution layer L5) sets the feature value group with the minimum size so that the final feature map may be output with a throughput that satisfies the system request throughput.

The detailed steps for setting the feature value group will be described with reference to FIG. 5. First, the system request throughput is determined (S11). As described above, it is assumed as a FSRCNN-s, which is a CNN that up-scales an FHD image applied at 60 frames with a resolution of 920×1080 to a UHD image with 3840×2160 resolution. Therefore, in order to satisfy the system request throughput, the final convolution layer L5 should be able to output the final feature map FM5 having a size of 1920×1080×4 at 60 frames per second (60 fps).

When the system request throughput is determined, a final feature value acquisition request time required to acquire each of the final feature values, which are feature values of the final feature map, is determined (S12). In order for the FSRCNN-s to output the UHD image at 60 frames, each frame image of 1920×1080×4 size should be acquired within 16.6 (=1,000/60) ms. It means that each of 1920×1080×4 final feature values of the final feature map FM5 corresponding to each frame image should be acquired within approximately 2.01 ns to satisfy the system request throughput.

When the final feature value acquisition request time is determined, all divisors for a size of an axial direction specified in the final feature map are extracted (S13). Extracting divisors for the size of the axial direction specified in the final feature map is to increase the efficiency of the operator included in the final convolution layer L5 by equally dividing the amount of operation to be performed in the final convolution layer L5 when applying the pipeline technique.

As shown in FIG. 1, the size of the final feature map FM5 is 1920×1080×4, in which as an example, it is assumed that a divisor for a size in a row direction is extracted. In other words, a set of divisors for size 1080 in the row direction [1, 2, 3, 4, 5, 6, 8, 9, 10, 12, 15, 18, . . . , 108, 120, 135, . . . , 540, 1080] is extracted. However, the present embodiment is not limited thereto, and a set of divisors may be extracted in a column direction Column or a depth direction Depth.

A minimum divisor (here, 1) of the set of extracted divisors is set as an initial operation size for the final convolution layer L5 (S14). Here, a size of an unspecified axis, that is, the column direction and the depth direction, may be fixed to a specified value. As an example, it may be fixed to a minimum value of 1 in the column direction and 4 to a maximum value in the depth direction. Therefore, a feature value group having a size of 1×1×4 may be set as the initial operation size in the final feature map FM5.

When the initial operation size is set, the operation time required for the final convolution layer L5 is determined according to the set initial operation size (S15). Assuming that each kernel of the final convolution layer L5 is implemented to include one operator, which is a minimum number, the time required for each kernel to perform a corresponding sized operation once is (3×3×32) clocks (clk) and 960 ns. However, when each kernel is implemented to include the number (here, 1×1×4) of operators corresponding to the initial operation size, the time required for the final convolution layer L5 to acquire each of the feature values of the final feature map FM5 is (3×3×32)/(1×1×4) clocks=(3×3×32)/(1×1×4)×3.333333=240 ns.

Then, it is determined whether the determined final feature value acquisition time satisfies a final feature value acquisition request time to achieve a system request throughput (S16). In other words, it is determined whether the determined final feature value acquisition time is 2.01 ns or less, which is the final feature value acquisition request time. If the final feature value acquisition time does not satisfy the final feature value acquisition request time, the next greatest divisor is selected from the set of extracted divisors (S17).

In the above example, the final feature value acquisition time is 240 ns, which greatly exceeds the final feature value acquisition request time of 2.01 ns. Therefore, when the final feature map is divided by a divisor of 1 in the row direction, it may be seen that the system request throughput cannot be determined. Thus, the next great divisor 2 may be selected. Then, the final feature value acquisition time according to the selected divisor is determined again. Until the determined final feature value acquisition time is less than or equal to the final feature value acquisition request time of 2.01 ns, a divisor with the next size may be repeatedly selected.

If the determined final feature value acquisition time satisfies the final feature value acquisition request time to achieve the system request throughput, i.e., if the determined final feature value acquisition time is less than or equal to the final feature value acquisition time of 2.01 ns, the feature value group with the size currently set in the final feature map is set as the initial feature value group with the minimum size that may satisfy the system request throughput (S18).

As an example, when a divisor 120 is selected by repeatedly selecting a divisor with the next size, a feature value group having a size of 1×120×4 may be set as an operation size in the final feature map FM5. In addition, when each kernel of the final convolution layer L5 is implemented to include the number (1×120×4) of operators corresponding to the size of the feature value group, the time required for the final convolution layer L5 to acquire each of the feature values of the final feature map FM5 is computed as a kernel size/the number of operators, i.e., (3×3×32)/(1×120×4)× 3.333333333=2 ns. This satisfies the request throughput of the system because the final feature value acquisition time (2 ns) is less than the final feature value acquisition request time of 2.01 ns. Accordingly, the feature value group having the size of 1×120×4 may be set as the initial feature value group of the final convolution layer L5.

Then, the fusing network is set by determining the size of the feature value group that each of the previous convolution layers L1 to L4 needs to acquire from the previous feature map corresponding to the initial feature value group, based on the initial feature value group with the set minimum size (S19).

As described above, if the feature value group having the size of 1×120×4 is set as an initial feature value group in the final feature map, based on this, it is possible to set the fusing network by determining a feature value group having a corresponding size from the previous feature map. Referring to FIG. 1, it may be seen that if the size of the initial feature value group in the final feature map is 1×120×4, the size of the feature value group in each of the first to fifth feature maps F1 to F4 and the input image IN forming the fusing network is (9×9×1), (5×124×32), (5×124×5), (3×122×5), (3×122×32), and (1×120×4).

Then, the number of operators corresponding to the size of the feature value group according to the fusing network is allocated to each kernel of the plurality of convolution layers L1 to L5 (S20). In other words, (5×124×32), (5×124× 5), (3×122×5), (3×122×32), and (1×120×4) operators may be assigned to each kernel of the first to fifth convolution layers L1 to L5.

Thereafter, an operation time required for each convolution layer according to the number of assigned operators is analyzed (S30).

If the number of operators corresponding to the size of the feature value group according to the fusing network set in each kernel of the convolution layers L1 to L4 is allocated, each kernel of each convolution layer L1 to L4 requires an operation time according to the assigned operator. Accordingly, each kernel in the first to fourth convolution layers L1 to L4 requires operation times of (5×5×1) clk=83.3 ns, (1×1×32) clk=106.6 ns, (3×3×5) clk=149.9 ns, and (1×1×5) clk=16.7 ns.

When the operation time required in each convolution layer L1 to L4 is analyzed, a convolution layer requiring a maximum operation time among the analyzed operation times is determined (S40). Here, it may be seen that the third convolution layer L3 requires the maximum operation time of 149.9 ns.

Further, a convolution layer requiring a minimum operation time is determined, and a feature value group corresponding to the determined minimum operation time layer is divided (S50).

Here, the fourth convolution layer L4 requires the minimum operation time of 16.7 ns. This means that even if the fourth convolution layer L4 is quickly acquired by operating a feature value group specified by the fusing network, other convolutional networks L1 to L3 and L5 may not complete the operation. Therefore, even if the number of operators corresponding to the size of the feature value group according to the fusing network is allocated to the fourth convolution layer L4, a standby time occurs. A standby time in which the assigned operator cannot be used occurs, thereby reducing the efficiency of the operator.

Accordingly, when the convolution layer requiring the minimum operation time is determined, the size of the feature value group output from the convolution layer determined in the fusing network is divided and corrected. Here, the size of the feature value group may be divided in a direction with a large number of divisors. Also, the size of the feature value group may be divided according to the smallest divisor other than 1 of the divisors. In the above example, the size of the feature value group of the fourth feature map FM4 output from the fourth convolution layer L4 is (3×122×32). Therefore, the number of divisors in the row direction is [1, 2, 61, 122], which is four, while the number of divisors in the depth direction is [1, 2, 4, 8, 16, 32], which is six. Therefore, the size of the feature value group may be divided into 2 in the depth direction, and corrected to (3×122×16).

Then, the operation time is recomputed by reallocating the operator according to the size of the divided feature value group (S60). In the above example, the size of the feature value group of the fourth feature map FM4 is divided into 2 and reduced to (3×122×16). Therefore, the operator is also reduced by ½ to compute the operation time again. Since the number of operators has been reduced to ½, the operation time is increased to (1×1×5)×2 clk=33.4 ns. Then, it is determined whether the computed operation time is less than or equal to the determined maximum operation time (S70). If it is determined that the computed operation time is less than or equal to the determined maximum operation time, a minimum operation time layer is determined again, and the feature value group corresponding to the determined minimum operation time layer is divided (S50).

However, if the computed operation time exceeds the determined maximum operation time, the size of the currently set feature value group is stored (S80). In other words, a convolution layer having the minimum operation time is repeatedly determined while the maximum operation time is not exceeded, the feature value group corresponding to the determined convolution layer is divided according to a direction in which the number of divisors is large, thereby increasing the operation time of the convolution layer having the minimum operation time.

When the feature value group corresponding to the convolution layer having the minimum operation time is repeatedly divided, as a result, the operation time of all the convolution layers L1 to L5 approaches the maximum operation time. Here, the size of the feature value group of the final convolution layer L5 of the fusing network and the size of the feature value group corresponding to the convolution layer having the maximum operation time do not change. Therefore, the standby time is minimized because the operation time of each convolution layer is equalized without changing the throughput of the CNN. In addition, since the number of operators allocated to the convolution layer having a relatively small operation time is repeatedly divided and reduced, it is possible to reduce the number of required operators while maintaining the same throughput. In other words, it will maximize the efficiency of using the operator.

However, this is to maximize efficiency based on the initial fusing network according to the size of the initial feature value group set in the final convolution layer L5. When the size of the feature value group of the final convolution layer L5 is changed, that is, when the fusing network is set differently, the efficiency of the operator may be further increased.

Then, it is determined whether the difference between the maximum operation time and the minimum operation time is minimized for all configurable fusing networks (S90). If there is an undetermined fusing network, the feature value group of the final convolution layer L5 is set to have a size according to divisors greater than the initial feature value group having a minimum size of 120 that satisfies the final feature value acquisition request time from the set ([1, 2, 3, 4, 5, 6, 8, 9, 10, 12, 15, 18, . . . , 108, 120, 135, . . . , 540, 1080]) of divisors in the specified direction of the final convolution layer L5, and the size of the feature value group of the previous convolution layers L1 to L4 is set based on the feature value group of the final convolution layer L5, thereby resetting the fusing network (S100).

Then, the number of operators corresponding to the size of the feature value group according to the fusing network is allocated to each kernel of the plurality of convolution layers L1 to L5 based on the reset fusing network (S20), the maximum and minimum operation times are determined among the operation times for each layer according to the assigned operator, and the operator is reallocated by dividing the size of the feature value group of the convolution layer having the minimum operation time, thereby minimizing the difference in latency between convolution layers.

If it is determined that the difference between the maximum operation time and the minimum operation time between each layer is minimized for all the fusing networks set while varying the size of the feature value group of the final convolution layer L5, the size of the feature value group for each stored fusing network is analyzed to determine the size of the feature value group for the fusing network that requires the minimum number of operators (S110).

Then, the CNN is designed in hardware by allocating the operator according to the size of the determined feature value group of the fusing network (S120).

As a result, in the method for optimizing the hardware structure of the CNN according to the present embodiment, at a level where each of the plurality of convolution layers L1 to L5 that outputs the feature map by operating according to the pipeline technique in the CNN including the plurality of convolution layers L1 to L5 satisfies the required throughput, in each operation step, it is possible to perform the operation for as uniform time as possible, thereby minimizing latency and maximizing the efficiency of using the operator.

The method for optimizing the hardware structure of the CNN as described above may be implemented to be executed in a hardware design device for implementing a CNN in hardware, in which the hardware design device may be implemented as, for example, an operation device that executes a designated program, such as a computer. In addition, the method according to the present disclosure may be implemented as a software program stored in a medium so that it may be executed in a hardware design device such as a computer. Here, a computer-readable medium may be any available medium that may be accessed by a computer and may also include any computer storage medium. A computer storage medium includes both volatile and nonvolatile, removable and non-removable media implemented in any method or technology for storage of information such as computer readable instructions, data structures, program modules, or other data, and it may include read only memory (ROM), random access memory (RAM), compact disk (CD)-ROM, digital video disk (DVD)-ROM, magnetic tape, floppy disk, optical data storage, or the like.

Although the present disclosure has been described with reference to the embodiment shown in the drawings, this is only exemplary. It may be understood that various modifications and other equivalent embodiments are possible from those skilled in the art.

Therefore, the true technical protection scope of the present disclosure should be defined by the technical spirit of the appended claims.

What is claimed is:

1. A method for optimizing a hardware structure of a convolutional neural network (CNN) comprising:
    searching an initial feature value group by which a final convolution layer located at a final stage among a plurality of convolution layers of the CNN is capable of outputting to satisfy a system request throughput required by a system, and setting an initial fusing network by analyzing a feature value group with a size corresponding to the initial feature value group searched in previous feature maps output from other convolution layers;
    computing an operation time for each layer by allocating the number of operators corresponding to the size of the feature value group to each of the plurality of convolution layers based on the initial fusing network or a reset fusing network, and dividing the size of the feature value group in a predetermined manner by determining a layer having a minimum operation time among the computed operation time for each layer; and
    repeatedly resetting the fusing network by changing the size of the feature value group of the final convolution layer in a predetermined manner, and determining the size of the feature value group having the smallest number of operators allocated based on the size of the feature value group divided in each fusing network, thereby finally determining the number of operators to be included in each of the plurality of convolution layers.

2. The method of claim 1, wherein setting the initial fusing network comprises:
    determining the system request throughput;
    extracting a divisor with a predetermined axial size from a final feature map output from the final convolution layer, sequentially selecting from a smallest divisor to a larger divisor from the extracted divisors, and setting an initial operation size set according to the currently selected divisor and a predetermined size in the remaining axis direction;

determining an operation time required for the final convolution layer according to the operation size;

setting a minimum operation size having an operation time that satisfies the system request throughput among the determined operation times as the initial feature value group; and determining the feature value group with the size corresponding to the initial feature value group from each of the feature maps output from each of the remaining convolution layers other than the final convolution layer and setting it as the initial fusing network.

3. The method of claim 2, wherein determining the system request throughput computes the system request throughput as a final feature value acquisition request time, which is a time at which a final feature value should be acquired, wherein the final feature value is the feature value of the final feature map that the final convolution layer outputs for a normal operation of the system.

4. The method of claim 3, wherein when the number of operators corresponding to the operation size set in the final convolution layer is allocated, determining the operation time computes the operation time as a final feature value acquisition time required for the final convolution layer to acquire one feature value from the final feature map.

5. The method of claim 4, wherein when it is determined that the final feature value acquisition time computed in setting the minimum operation size as the initial feature value group is greater than the final feature value acquisition request time, setting the operation size selects a divisor greater than the currently selected divisor among the divisors with the predetermined axial size in the final feature map.

6. The method of claim 5, wherein when it is determined that the computed final feature value acquisition time is less than or equal to the final feature value acquisition request time, setting the minimum operation size as the initial feature value group sets the currently selected divisor and the operation size of the predetermined size in the remaining axis direction as the initial feature value group.

7. The method of claim 6, wherein setting the initial fusing network comprises determining the feature value group with the size corresponding to the initial feature value group set in each of the feature maps output from the remaining convolution layers, based on at least one kernel size of the remaining convolution layers other than the final convolution layer and setting the initial fusing network.

8. The method of claim 7, wherein dividing comprises:
assigning the number of operators corresponding to the size of the feature value group set in each of the plurality of convolution layers corresponding to the initial fusing network or the reset fusing network;

computing an operation time required to operate the feature value group corresponding to each of the plurality of convolution layers according to the number of assigned operators;

determining a maximum operation time and a minimum operation time among the operation times computed for each of the plurality of convolution layers;

determining the convolution layer having the minimum operation time, and dividing the size of the feature value group corresponding to the determined convolution layer;

reducing the number of operators according to the divided size of the feature value group and reallocating them, and re-computing the operation time;

storing the divided size of the feature value group and re-determining the convolution layer having the minimum operation time again based on the recomputed operation time when the recomputed operation time is less than or equal to the maximum operation time; and determining a size of a previously last stored feature value group as a size of an optimal feature value group of the currently set fusing network.

9. The method of claim 8, wherein dividing the size of the feature value group comprises:
determining a size in each axial direction of the feature value group;

analyzing the number of divisors with each of the determined axial sizes;

selecting an axial direction having the greatest number of divisors among the number of analyzed axial divisors; and dividing the feature value group in the selected axial direction.

10. The method of claim 9, wherein dividing in the axial direction divides the feature value group into the smallest divisor other than 1 of the selected axial divisors.

11. The method of claim 8, wherein finally determining comprises:
repeatedly resetting a plurality of fusing networks corresponding the feature value group that is set by selecting the divisor greater than the divisor set as the initial feature value group among the divisors extracted from the predetermined axial size in the final feature map;

dividing the size of the feature value group corresponding to the convolution layer having the minimum operation time for each of the plurality of fusing networks that are repeatedly reset and comparing the total number of operators required according to the determined size of the optimum feature value group; and determining the size of the optimal feature value group with the smallest number of operators required, and determining the number of operators to be included in each of the plurality of convolution layers according to the fusing network corresponding to the determined size of the optimal feature value group.

12. The method of claim 11, wherein in the CNN, the plurality of convolution layers perform an operation according to a pipeline technique.

13. The method of claim 11, wherein when the operation on the feature value group specified by the fusing network is performed in a previous convolution layer, the operated feature value group is applied to each of the plurality of convolution layers and each of the plurality of convolution layers performs the operation.

14. The method of claim 11, wherein in the CNN, an FSRCNN-s, which up-scales an FHD image to a UHD image, is implemented in hardware.

15. A non-transitory computer readable recording medium in which program instructions for implementing the method for optimizing the hardware structure of the CNN according to claim 1 is recorded.

* * * * *